April 22, 1969  L. M. HUBBY  3,440,512
ELECTRIC MOTOR CONTROL SYSTEM FOR A BEAM TYPE PUMPING LOAD
Filed Dec. 28, 1965  Sheet 1 of 2

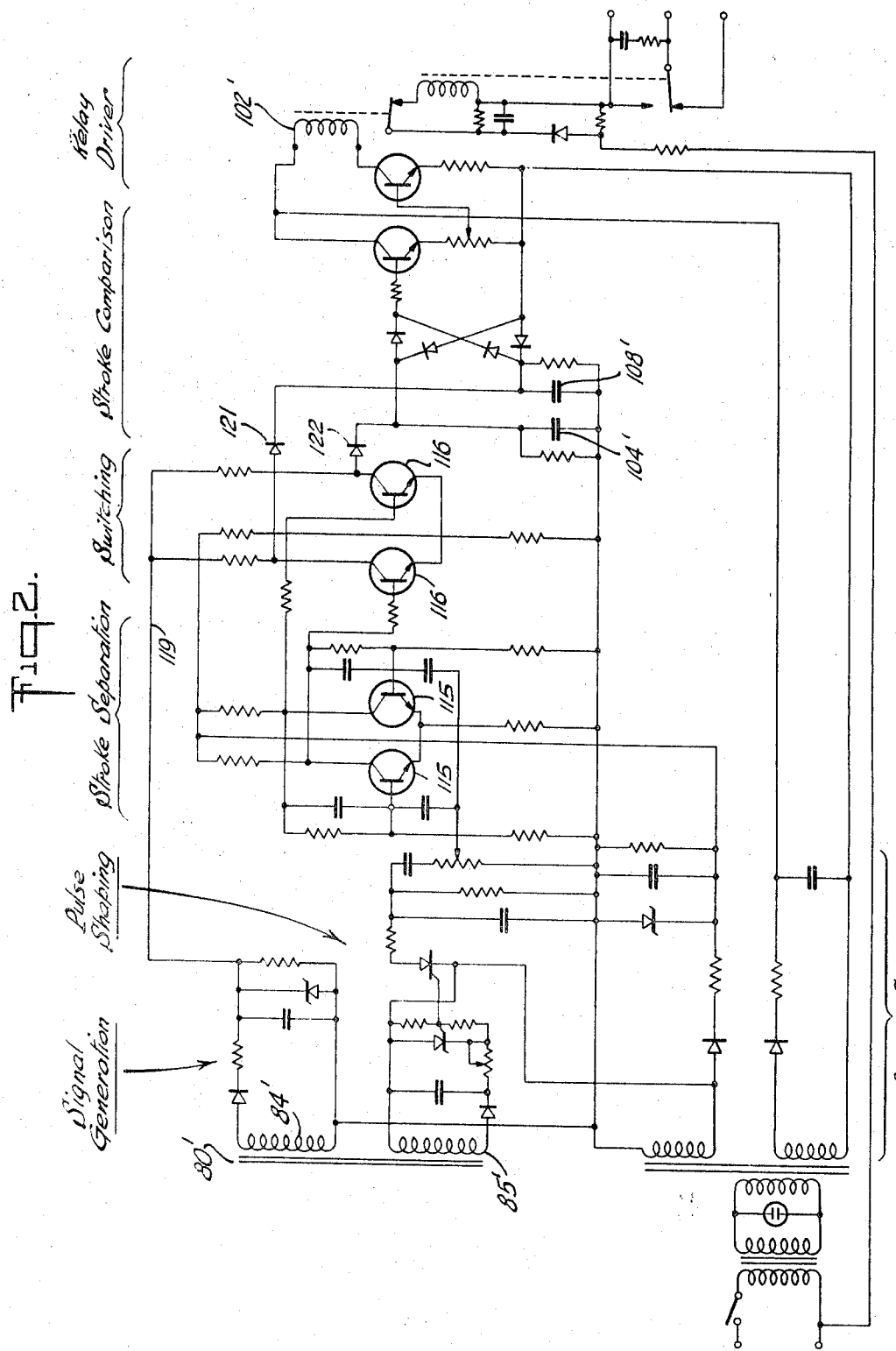

United States Patent Office 3,440,512
Patented Apr. 22, 1969

3,440,512
ELECTRIC MOTOR CONTROL SYSTEM FOR A
BEAM TYPE PUMPING LOAD
Laurence M. Hubby, Bellaire, Tex., assignor to Texaco
Inc., New York, N.Y., a corporation of Delaware
Filed Dec. 28, 1965, Ser. No. 516,949
Int. Cl. H01p 1/04, 3/06; H02h 7/08
U.S. Cl. 318—474        8 Claims

ABSTRACT OF THE DISCLOSURE

An electric motor control system where the motor has a normal load that has long period cyclic variation and the abnormal load has substantial flattening of every other maximum load peak only. A relay for controlling shut down of the motor under abnormal load conditions is actuated by a predetermined difference in successive maximum load peaks.

---

Figure 1:
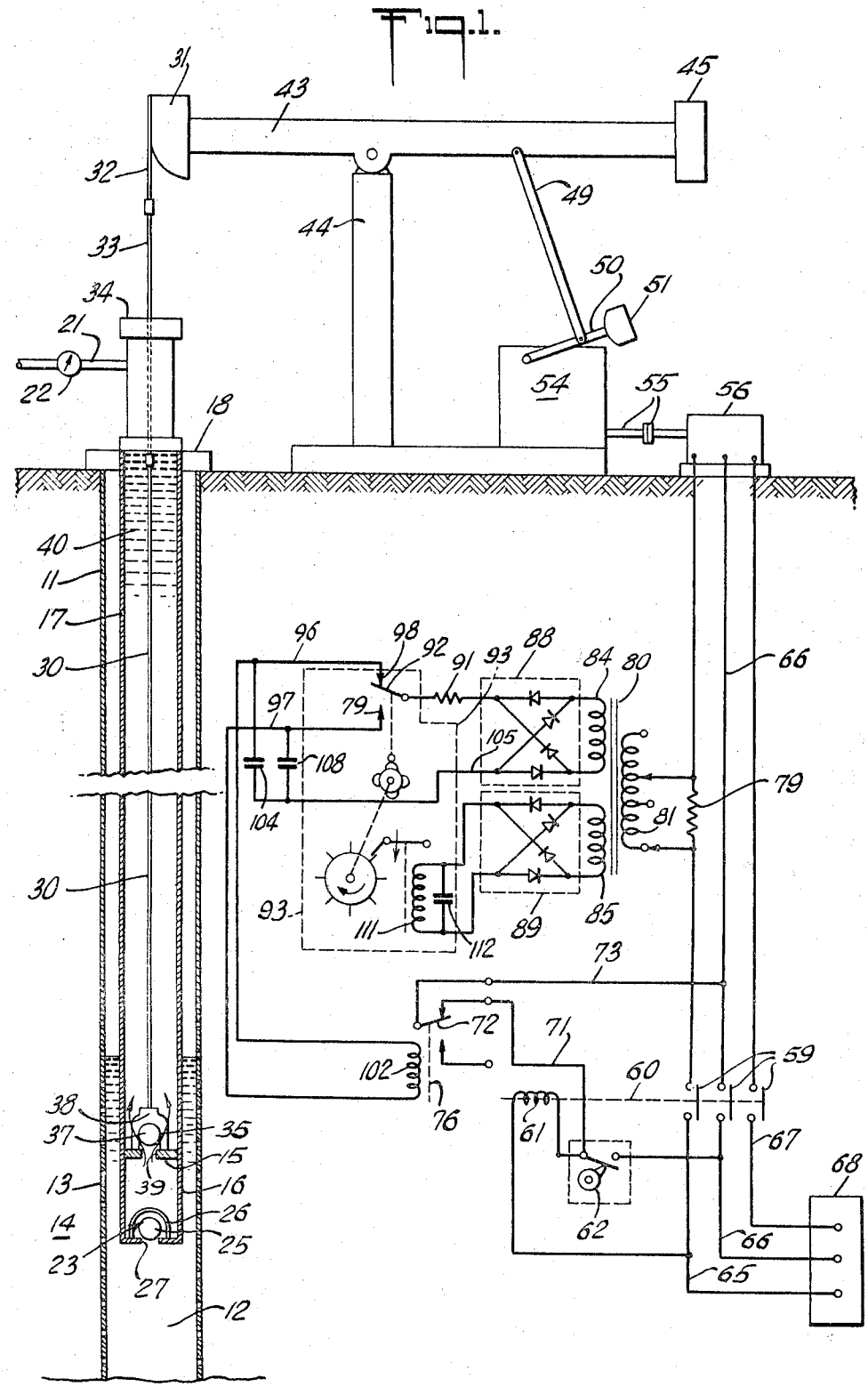

This invention concerns an electric motor control system in general, and more specifically relates to a control system for an electric motor that is subjected to a cyclic load which normally varies between a given maximum and minimum on successive cycles but which under loss of working load has the maxima of alternate ones of successive cycles reduced in amplitude considerably.

While there may be various other applications for a motor control system in accordance with this invention, it is particularly adapted for use in oil well pumping of the type wherein a reciprocating pump is employed so that the load on the motor varies under normal conditions cyclically from a maximum to substantially zero. This is true for a so-called beam-type pump that is frequently employed in oil fields.

As discussed in my co-pending application Ser. No. 496,406 filed Oct. 15, 1965, prior attempts to provide a system for shutting down the motor of a beam-type pumping system have been relatively unsuccessful. A principal reason for the prior difficulties has been that indicated in my co-pending application, i.e., the fact that the change in total load upon the motor is largely only measurable during one-quarter of a total pumping cycle or one-half of the return stroke of the beam pump. Thus, while one improvement over the prior art which increases the sensitivity and reliability for causing shut-down upon the encountering of pumped off conditions, has been described in my co-pending application, this invention provides for a different approach to the problem and one that has its own advantages and benefits.

An object of this invention is to provide an electric motor control system that is applicable to a beam-type reciprocating vertical stroke pumping arrangement, or the like, such that the motor is subjected to a cyclic load normally varying between substantially the same maximum and minimum on successive cycles but under loss of working load having the maxima of alternate ones of successive cycles reduced considerably. The arrangement includes provision for determining the difference between successive maxima. This determination results in substantially zero difference under normal conditions, but there is a difference that will appear upon loss of the working load, i.e., under pumped off conditions.

Briefly, the invention concerns an electric motor control system wherein said motor is subjected to a cyclic load normally varying between substantially the same maximum and minimum on successive cycles, but under loss of working load having the maxima of alternate ones of successive cycles reduced considerably. The system comprises an electric circuit means for measuring the amplitude of said load on said motor, and means responsive to said circuit means for integrating said amplitude measurements separately for said successive cycles. The system also comprises means for determining the difference between said separately integrated measurements, and means actuated by said last named means for deenergizing said motor.

The foregoing and other objects and benefits of the invention will be more fully set forth below in connection with the best mode or modes contemplated by the inventor of carrying out the invention, and in connection with which there are illustrations provided in the drawings wherein:

FIGURE 1 is a schematic layout showing the entire system including the electrical circuitry, for a preferred embodiment of the invention; and FIGURE 2 is a circuit diagram illustrating a modification for the load sensitive portion of the system, which employs solid state electronic elements rather than relays as in the FIGURE 1 modification.

FIGURE 1 illustrates a preferred embodiment of the invention wherein an electric motor control system is employed with a motor that is connected mechanically to drive a beam-type deep well pumping unit. Of course, there may be other types of mechanical load for an electric motor, having similar characteristics as the illustrated beam pumping arrangement. However, the illustrated application of a motor control system is one of particular concern and for which the system according to this invention was developed.

A typical beam-type pumping unit is schematically illustrated in FIGURE 1 in connection with a well that is being pumped to withdraw oil, or a mixture of oil and water therefrom. As shown, there is a cased well 11 that is perforated or has a screen 13 downhole, in order to admit well fluid 12 from a surrounding formation 14 to the interior of the well 11. From there, it is pumped to the surface by means of a reciprocating pump schematically illustrated.

The pump includes the following basic elements that are illustrated. There is a plunger or piston 15 that moves in a vertical reciprocating manner within a cylindrical barrel 16. The barrel is carried at the lower end of a string of tubing 17 which extends to the surface where it connects to a well head 18. There are internal fluid connections (not shown) with a fluid delivery pipe 21, which may have a flow meter 22 connected therein, if desired.

The lower end of the barrel 16 has a check-valve 23 including elements such as the schematically illustrated structure with a ball 25 and a yoke 26 for maintaining the ball in operative proximity to a port 27. The port 27 admits the fluid 12 from the well into the interior of the barrel 16 during each upstroke of the piston or plunger 15.

It will be observed that the plunger 15 is attached to the lower end of a rod 30. In actual practice, this rod 30 is made up of a string of so-called sucker rods (not shown) which connect the vertically moving piston or plunger of the pump with a horsehead 31 by means of a flexible cable 32 and a polished rod section 33. The polished rod passes through a stuffing-box 34 which is carried by the well head structure 18.

There is a traveling valve 35 on plunger 15. This too is schematically shown, and it includes a ball 37 carried under a yoke 38 to which the rod 30 is attached. There is also a port 39 located in the piston 15, with which port the ball 37 cooperates to provide the desired check-valve action as required.

It will be appreciated that the action of the pump is conventional for a reciprocating lift type pump. When the plunger 15 is moved vertically upward within the barrel 16, it will lift a column of fluid 40 thereabove that is within the tubing string 17. This is, of course, by reason of the fact that the traveling check-valve 35 will be closed during such upstroke. Thus, some of the fluid 40 will be forced out through the pipe 21. At the same time some of the well fluid 12 will flow into the barrel 16 through the standing valve 23 to fill the space beneath the piston 15. Thereafter, during the downstroke of the plunger 15, the fluid which has flowed into the barrel 16 will force open the traveling valve 35 by lifting the ball 37 so that fluid may thus flow through port 39 and join the fluid in column 40. The latter fluid flow action is insured by reason of the standing valve 23.

If the well becomes "pumped-off," then there will be insufficient fluid in the well to flow through the port 27 and fill the barrel 16. Under such circumstances it will be noted that the upstroke remains substantially normal, in that the column of fluid 40 will be lifted as before. However, the downward movement will involve a substantially reduced load on the pumping system, because under such circumstances there will be no fluid beneath the piston 15 to create resistance to its downward movement in the barrel 16. Thus, the weight of the fluid column 40 will merely ride downward with the plunger and cause a reduced load during the downward stroke. This is illustrated and described more fully in connection with some figures of the drawings in my abovementioned co-pending application.

A balanced beam structure for actuating the pump elements described above, is also schematically shown. It includes a rocker arm 43 that supports the horsehead 31 at the end thereof. The arm is pivotally supported from the top of a supporting post 44. There is a counterweight 45 at the other end of the beam, or arm 43, and the arm is rocked about the pivot by means of a connecting rod 49 which is pivotally connected to the arm 43 and a crank arm 50 which has another counterweight 51 at the free end thereof. The crank arm 50 is driven in rotation by the output of a gear box 54, the input of which is in turn driven by a shaft and coupling 55. The latter makes connection to an electric motor 56.

The control system for motor 56 is shown by a schematic electrical diagram, which includes a switch 60. The switch 60 includes three make-and-break contacts 59 and a solenoid 61. It may be a conventional type motor start switch, and it includes as auxiliary equipment a periodically controllable switch 62 that determines the closing of an energizing circuit for the solenoid 61. Such energizing circuit is across two of the three power supply wires 65 and 66. Motor 56 is preferably a three phase type so that the supply includes the wires 65 and 66 together with a third wire 67. These connect the motor 56 with a source of electrical power supply 68.

It will be observed that there is a holding circuit for solenoid 61. This includes a circuit connection 71, one of the contacts of a switch 72 and another circuit connection 73 which leads to the power supply wire 66 between contact 59 and the motor 56. In this manner the motor 56 will be maintained connected to the power supply, following its start-up period, so long as the load on the motor remains normal. That is, so long as there is not a pumped-off condition in the well that is being pumped. This is because of a relay 76 that incorporates the contacts of the switch 72. The relay is actuated under predetermined conditions as will be explained in greater detail below.

The control circuit for relay 76 includes an impedance, such as a resistor 79, that is located in series in one of the three power supply wires, e.g., the wire 65. It will be noted that this impedance is located between the contact 59 of switch 60 and the motor 56. This resistor 79 will create a voltage drop thereacross that is in direct proportion to the total current being drawn by the motor 56.

There is a voltage step-up transformer 80 that has a primary winding 81 connected across the resistor 79 and a pair of secondary windings 84 and 85. The ends of winding 84 are connected to a full wave rectifier 88, while the ends of winding 85 are connected to another full wave rectifier 89.

The output of rectifier 88 is connected from one side to one end of a resistor 91 which has the other end thereof connected to a moveable contact 92 of a ratchet relay 93. Consequently, one side of the output from rectifier 88 may be connected alternatively between a circuit wire 96 or another circuit wire 97.

Circuit wire 96 connects a stationary contact 98, of the ratchet relay 93, with one end of a winding 102 of the relay 76. Also, another stationary contact 99 is connected via the wire 97 to the other end of the winding 102.

The wire 96 also has connected thereto one side of a capacitor 104 the other side of which is connected via a wire 105 to the other side of the full wave rectifier 88. Similarly, wire 97 has connected thereto one side of another capacitor 108, the other side of which is also connected to the same wire 105 and thus back to the other side of rectifier 88 also. In this manner the winding 102 of relay 76 is connected to the corresponding one side of each of the capacitors 104 and 108 so that it will be energized only whenever the potentials across these two capacitors differ.

It will be appreciated that this arrangement provides for an integration of the DC potential output from rectifier 88 during the time when it is connected across capacitors 104 and 108 in alternation, depending upon the position of moveable contact 92 of the ratchet relay 93. Consequently, since the contact 92 is shifted back and forth each cycle and successive cycles are representative of, or correspond to the "up" stroke and the "down" stroke in succession; the integrated potential on one of the capacitors 104 or 108 will be proportional to the load on the motor during the upstrokes while that on the other capacitor will be proportional to the load during the downstrokes. Under normal pumping load conditions, the maximum output of rectifier 88 will be substantially the same for successive cycles, i.e., for both the upstroke and downstroke portions of a complete pumping cycle. Therefore both of the capacitors 104 and 108 will be charged to substantially equal voltages, and there will be substantially no current flow through winding 102 of the relay 76 so that it will remain deenergized.

However, under loss of working load on the system, i.e., when the well is pumped off, there will be an appreciable difference between the voltage output from rectifier 88 during one of the cycles as compared to that during the next succeeding cycle. This means that there will be current flow through the winding 102 in one direction or the other and in either case it will be energized so that the motor 56 will be shut down.

The operation of ratchet relay 93 is controlled so as to cause it to be stepped once every motor load cycle, by having the output of rectifier 89 connected directly across a control winding 111 of the relay 93. It will be observed that this means that the stepping takes place each successive cycle, i.e., upstroke followed by downstroke followed by upstroke again, etc.

A smoothing capacitor 112 is connected across the winding 111. It will be noted that the circuit constants should be arranged such that even though the voltage output from secondary winding 85 is low, it will be sufficient to provide for a rectified DC signal of adequate power to energize the ratchet relay 93 (winding 111) sufficiently to cause a complete step of operation thereof. Consequently, the ratchet relay 93 will be stepped once every operating cycle of the system both upstroke and downstroke irrespective of whether the average load has changed, i.e., whether the well has become pumped off or not. Therefore, the switch blade 92 will be shifted each cycle and will always be in contact with the same stationary contact 98 or 99 during a given one of the upstroke or downstroke respectively.

It is to be especially noted that this arrangement provides for a "difference" output from the system, as applied to the control winding 102 of relay 76. Therefore, the action is independent of absolute amplitude, i.e., changes in the voltage outputs from rectifiers 88 and 89 that would be caused by changes in conditions on the system load such as temperature change which would cause difference in the viscosity of the fluid being pumped. Consequently, the motor control system according to this invention is highly sensitive and will cause shutdown immediately upon the detection of pumped off conditions without being subjected to malfunction or un-desired shutdown by reason of changes in overall conditions such as power supply variations or the like.

Referring to FIGURE 2, it is to be noted that the corresponding elements which are also found in the FIGURE 1 system, have corresponding reference numbers but with a prime mark added. As indicated previously, the FIGURE 2 circuit is an alternative arrangement for the difference measuring control circuit illustrated in FIGURE 1 which interconnects transformer 80 and relay 76. Consequently, the details of this system need not be described, but rather the general mode of operation thereof will be sufficient. Thus, in the FIGURE 2 illustration there are various solid state devices which are shown by conventional symbols. These include transistors as well as a silicon controlled rectifier, etc. The portions of the circuit that are for carrying out the various functions, are shown by captions.

It will be noted, briefly that there is a transformer 80' at the input of the system which has a pair of secondary windings 84' and 85' thereon. The "load proportional" signal is that provided at the output of winding 84', as is indicated by the caption "Signal Generation"; while the signal for actuating the switching function that must operate on every cycle, is developed from signals provided at the output of the winding 85'. The latter signal is shaped into a pulse by the portion of the system indicated by the caption "Pulse Shaping." This section provides a control pulse every cycle irrespective of whether the relative load on alternate cycles has changed.

The so-called "stroke separation" function is that which alternately causes the switch to be shifted so that every other cycle is connected to a given one of the integrating capacitors. This is carried out by means of reversing the state of conduction of a pair of transistors 115. These are connected in a so-called flip-flop circuit so that they will be shifted from one stable state to the other in alternation, with one of the pair conducting and the other cut off. This provides control voltages which correspond with the state of conduction so that they may act as controls for causing the switching function to take place at a succeeding pair of transistors 116. Transistors 116 are both connected to the "load proportional" signal via the circuit including a connection 119, so that they will act to determine which of the alternative paths via a rectifier 121 or another rectifier 122 will be operative to charge either the capacitor 104' or 108'. These capacitors have the same basic function as the corresponding ones 104 and 108 of FIGURE 1, as the caption "Stroke Comparison" indicates. In FIGURE 2, there is a two stage amplifier between the capacitors and a winding 102' of the control relay. It amplifies the potential difference between the charges on capacitors 104' and 108' in order to provide enough power to operate the relay, as indicated by the caption "Relay Driver."

There will, of course, be a separate power supply required in connection with the FIGURE 2 circuit arrangement. However, the elements thereof (indicated by the caption "Power Supply") are conventional and well known, so that no detailed description thereof is deemed necessary.

It will be appreciated that the various elements of both modifications of the system which have been described above are conventional. Thus, for example, the ratchet relay 93 illustrated in FIGURE 1 may take the form of a commercially available instrument such as one manufactured by Potter and Brumfield and designated as the "AP Series Ratchet, Impulse."

Operation

Conditions during pumping operations will cause a cyclic variation of the load on motor 56 from substantially zero to a maximum and back again for each half portion of the complete pumping cycle, i.e., for each of the upstroke and the downstroke respectively. This has been described in more detail in my copending application, and with reference to diagrams showing the absolute load amplitudes. It is deemed that such detail need not be repeated here for an adequate understanding. It will be sufficient to observe that under normal load conditions there will be a rise to a maximum that takes place during an upstroke and another similar rise to a maximum that takes place during a downstroke, with this cyclic alternation repeating continuously. As this takes place, the signal output from secondary 84 of the transformer 80 provides the voltage that is rectified and applied to the switchblade 92 of the switch actuated by ratchet relay 93. Then, because the ratchet relay 93 is actuated each cycle continuously, the switchblade 92 will be shifted alternately from the upper position illustrated to the lower position where it contacts stationary contact 99. Therefore, for every upstroke cycle the voltage output from rectifier 88 will be applied to one or the other of the capacitors 104 or 108, while the voltage output during the downstroke cycle will be applied to the other of these capacitors. Thus, each of the capacitors 104 and 108 is charged in accordance with the load on upstroke or downstroke cycles, respectively, so that under normal pumping conditions they are equally charged. However, under pumped off conditions one of them will be charged to a lesser degree, so that there will be a difference in the charges and this difference will cause current flow in the winding 102 which will thus actuate the relay 76 and cause shutdown of the motor 56.

Without going into detail, it will be clear that the same general effect is created by the solid state circuit elements illustrated in FIGURE 2, so that the difference signal between the charge on capacitors 104' and 108' will be detected and applied to cause actuation of the relay having winding 102' thereon.

It will be appreciated by anyone skilled in the art that there might be other arrangements provided for switching the output of winding 84 (and rectifier 88) from one to the other of the integrating capacitors 104 and 108. Thus, for example, a mechanically connected linkage (not shown) might be arranged in connection with the rotation of arm 50 (that is driven by the gear box 54) so as to throw the switchblade 92. In this way, the same application of signals corresponding only to a given one of the up or downstrokes would be applied to the respective integrating capacitors 104 and 108. Such an arrangement would eliminate the necessity for the ratchet relay 93, but, of course, would entail additional mechanical elements (not illustrated).

While particular embodiments of the invention have been described above in considerable detail in accordance with the applicable statutes, this is not to be taken as in any way limiting the invention but merely as being descriptive thereof.

I claim:
1. An electric motor control system wherein said motor is subjected to a cyclic load normally varying between substantially the same maximum and minimum on successive cycles, but under loss of working load having the maxima of alternate ones of successive cycles reduced considerably, comprising
   electric circuit means for measuring the amplitude of said load on said motor,
   means responsive to said circuit means for separately determining said amplitude measurements of successive cycles,
   means for determining the difference between said separate amplitude measurements, and means actuated by said last named means for deenergizing said motor.

2. An electric motor control system wherein said motor is subjected to a cyclic load normally varying between substantially the same maximum and minimum on successive cycles, but under loss of working load having the maxima of alternate ones of successive cycles reduced considerably, comprising electric circuit means for measuring the amplitude of said load on said motor, means responsive to said circuit means for integrating said amplitude measurements separately for said successive cycles, means for determining the difference between said separately integrated measurements, and means actuated by said last named means for deenergizing said motor.

3. An electric motor control system according to claim 2 wherein said means responsive to said circuit means comprises a pair of capacitor means one for each of said successive cycles, and means for charging each of said capacitor means in proportion to one of said amplitude measurements of successive cycles.

4. An electric motor control system according to claim 3 wherein the means for determining the difference comprises electromagnetic means connected between said pair of capacitor means.

5. An electric motor control system according to claim 4 wherein the means for deenergizing said motor comprises relay means.

6. An electric motor control system according to claim 3 wherein the means for charging each of said capacitor means comprises means for switching said load amplitude measurements alternately between said capacitor means.

7. An electric motor control system according to claim 6 wherein the means for determining the difference comprises electromagnetic means connected between said pair of capacitor means.

8. An electric motor control system according to claim 7 wherein the means for deenergizing said motor comprises relay means.

References Cited

UNITED STATES PATENTS

| | | | |
|---|---|---|---|
| 2,804,587 | 8/1957 | Bregman | 318—447 X |
| 2,917,175 | 12/1959 | Toma | 318—474 X |
| 2,947,931 | 8/1960 | Hubby | 318—474 X |
| 3,184,644 | 5/1965 | Faglie | 317—27 X |
| 3,233,153 | 2/1966 | Ryan | 317—123 X |
| 3,312,867 | 4/1967 | Sonnemann. | |

ORIS L. RADER, *Primary Examiner.*

B. A. COOPER, *Assistant Examiner.*

U.S. Cl. X.R.

317—27; 318—447; 328—135